Patented May 15, 1945

2,376,252

UNITED STATES PATENT OFFICE 2,376,252

OXIDE CATALYSTS IN DEHYDROGENATION OF CYMENE

Washington Hull, Noroton Heights, Conn., assignor to American Cyanamid Company, New York, N. Y., a corporation of Maine No Drawing. Application January 9, 1943, Serial No. 471,877

6 Claims. (Cl. 260—668)

This invention relates to the catalytic dehydrogenation of terpenes. More particularly, the invention relates to the production of p-cymene by the vapor phase dehydrogenation of such monocyclic terpenes as dipentene, limonene, terpinolene, terpinenes and the like, in the presence of a suitable chromium oxide containing catalyst.

Due to the growing importance of cymene as an intermediate in the production of such styrenes as methyl and α-4-dimethyl styrenes, and as an intermediate in the preparations of nitrogenous gasoline additives, increasing interest has been shown in its preparation from terpenes. The possibility of converting a monocyclic terpene such as dipentene to p-cymene according to the theoretical equation

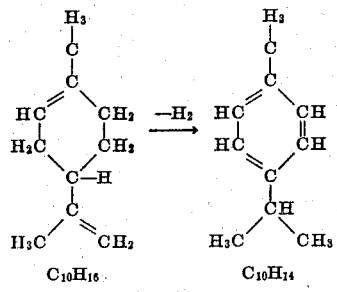

has long been considered as a method of obtaining the latter on a commercial scale. However, heating alone has proved to be inadequate to carry out the reaction. As a consequence, considerable work has been done in investigating catalytic methods for promoting the reaction.

Because of its adaptability to continuous production on a large scale, catalytic dehydrogenation in the vapor phase has received particular attention. Unfortunately, while the process is desirable from a procedural point of view, its practice has been subject to a number of drawbacks which in the past have prevented its commercial development.

The principal difficulty encountered in utilizing the process has been in the development of a suitable catalyst. The reaction has been carried out with some degree of success making use of such catalysts as fuller's earth, kieselguhr, activated carbon and the like. The best results with these catalysts have been obtained by contacting the terpene with the catalyst at reaction temperatures of 100–200° C. in the liquid phase and from about 225–350° C. in the vapor phase. However, these catalysts are too inactive and the conversions obtained are too low to serve as a suitable basis for commercial development.

When attempts were made to use the higher operating temperatures with these catalysts, the final results were poor. While it might be generally supposed that the conversion to cymene could be improved by raising the reaction temperature, actually with most catalysts the extent to which cracking occurs is found to increase even more rapidly. An examination of the illustrative equation set forth above shows that the reaction is not simple. Not only is it necessary to remove hydrogen from some of the carbon molecules but it must also be added to others. Hence the reaction has sometimes been referred to as involving both dehydrogenation and hydrogenation.

The reaction is further complicated by the possibility of cracking both the original terpenes and the wholly or partially dehydrogenated reaction products. Therefore, it is not particularly surprising to find that raising the temperature with the catalysts proposed by the art actually reduced the cymene production whereas the production of such side reaction products as toluene, ethyl toluene, methane and the like was increased. In some cases considerable isoprene is found. As a result, it was thought that temperatures above about 325° C. could not be safely used.

Nor did attempts to make use of more active types of dehydrogenation catalysts provide an acceptable solution to the difficulty. Metallic catalysts, such as nickel or copper for example, are too active. In order to prevent excessive cracking and tar formation they must be used at such low temperatures in producing p-cymene that the equilibrium conditions are unfavorable. Metallic catalysts of these types as well as the easily reducible metal oxides are particularly troublesome in that they tend to crack off the isopropyl group.

Many catatlysts were found to produce a disproportionate yield of p-menthane. This latter is particularly unfortunate since once the production of p-menthane in appreciable quantities occurs, the equilibrium conditions are such that it is exceedingly difficult to completely dehydrogenate to cymene unless excessive contact times are employed. This latter is impractical since it tends to increase the losses of desirable products by increasing the amount of cracking which occurs.

Based on these experiences the art believed that it was necessary to find a catalyst which would not only give a good conversion without a disproportionate yield of p-menthane, but that it must also find a catalyst which would be operative at temperatures low enough to prevent cracking difficulties. One process, developed by research along these lines, is set forth in my U. S. Patent 2,272,711. In that case it was shown that by the use of a finely divided palladium metal catalyst on such surface active supports as activated carbon and alumina good results can be obtained. Excellent conversion of the terpene to a product remarkably free from such cycloaliphatic compounds as p-menthane were obtained using reaction temperatures of about 250–275° C.

These catalysts, while giving excellent results, are subject to a number of inherent drawbacks from the point of view of commercial development. The catalyst itself is, from an industrial point of view, relatively expensive to prepare. Further, since a number of materials tend to poison the catalyst, it is desirable to feed a material of high purity in order to prevent undue shortening of the active life of the metal catalyst. In addition, they can not be readily activated merely by heating in the presence of air, a procedure which is easily carried out and is desirable in a commercial process.

Where it is desirable to produce a product of particularly high purity, the palladium metal catalysts are highly superior. However, from the point of view of commercial production on a large scale, ease of preparation at low cost and ease of reactivation are such desirable properties in the catalyst to be used that they may often outweigh the added advantage of being able to produce a more nearly pure product without the necessity for further purification.

Consequently, there remains a demand for a process using a suitable catalyst which will give a good cymene yield, low in p-menthane content, and without an undue amount of cracking either of the material fed or of the intermediate products. At the same time, it is highly desirable that the catalyst be one which is relatively cheap to produce, has a long active life and can be readily reactivated. It is therefore an object of the present invention to develop such a group of catalysts and a process by which it can be utilized.

In general, the objects of the present invention are accomplished by carrying out a vapor phase dehydrogenation using a catalyst comprising chromium oxide, with or without the addition of one or more oxides selected from the group comprising the oxides of copper, zinc, tin, cobalt, nickel and manganese. Contrary to the teachings of the prior art, it was not only found unnecessary to use temperatures below 300–325° C., but it is impractical to do so with these catalysts. Reaction temperatures of 100° or more higher than the limits imposed on the reaction by the prior art were found to give the best results. In this way conversions of 80–90% were readily obtained.

In evaluating the experimental results it is necessary to allow not only for the percent of the material which is converted to cymene, but also for the amount of material which is lost through cracking and other causes. For comparative purposes therefore, an arbitrary index was used. This index is one one-hundredth of the product of the percent of the feed recovered as condensate and the percent converted to cymene. For example, where 75% of the feed is recovered as condensate containing 80% cymene the index is (75×80)/100 or 60. This enables a comparison of the results obtained when using different operating conditions and different catalysts to be made.

In carrying out the process of the present invention, the monocyclic terpenes which constitute the raw materials may be obtained from any suitable source. Dipentene, which is commercially available in acceptable quantities, was found to give excellent results. It may be obtained for example by isomerization of α-pinene, which is in turn obtained from the sulfate turpentine produced as a by-product in the sulfate digestion of coniferous woods for the manufacture of paper pulp. The α-pinene may be isomerized as a separate reaction either in the vapor or liquid phase, and the vapors of the resultant monocyclic terpenes passed directly over the catalyst of the present invention. It is not necessary that the monocyclic terpene be pure. Accordingly, the products obtained by the isomerization of α-pinene for example may be used directly without fractionation.

Nor is the process of the present invention restricted to the use of a particular apparatus. The materials to be treated must be vaporized and the vapors passed over the catalyst mass in the reaction chamber at a temperature and rate dependent upon the amount of catalytic mass being used. The reaction products may be collected as by condensation and separated into their respective components as by fractional distillation. So long as these functions may be performed, the design and exact structure of the apparatus may be varied also at will. The development work was carried out using both glass and stainless steel reaction vessels. However, any material which is catalytically inactive, does not contaminate the materials and is resistant to intergranular attack by the hydrogen liberated during the reaction may be used.

Two controls were found to be of primary importance in carrying out the reaction successfully. These are the temperatures at which the reaction is carried out and the rate at which the vapors are passed over the catalyst. While the temperature is the least critical, both are important in obtaining satisfactory results. It was found that the optimum temperature varied with the nature of the feed, the amount of feed, the volume of catalyst and the like. Once the approximate optimum is determined, variations from this optimum of from 25–30° C. in either direction are not particularly objectionable, although the closer the control the better the results. Too low a temperature results in a poor production, due to the lowering of the reaction rate. Too high a temperature results in excessive cracking and tar formation. In general, temperatures of from about 375–475° C. were found to be satisfactory for a rate of feed within the ranges tested. The invention, however, is not meant to be so limited since in some cases temperatures as high as 500° C., or higher proved satisfactory.

The rate of feed, vaporized per unit time was found to have the most pronounced effect on the degree of conversion to the desired products. In general, a feed rate of from 10 to 100 cc. per hour per 100 cc. of catalyst was found to give good results within the temperature ranges from 375–475° C., although the invention is not necessarily to be so limited.

All of the catalysts of the present invention have a particular advantage, in addition to their being relatively inexpensive and easily prepared in that they can be readily reactivated. Further they exhibit little, if any, decrease in catalytic activity after as many as thirty cycles. Regeneration is readily carried out by heating the mass while passing air over it. With some of the catalysts, particularly those containing oxides of tin, it is well to flush out the catalyst with hydrogen after the burning off. However, this is not absolutely necessary since acceptable results may be obtained without so doing.

The method of preparing the catalysts for use in the process of the present invention is not particularly critical. It may be done in any preferred manner. Preferably it should be done under conditions which promote the lowest apparent density so as to create a large surface area. In general, the catalysts used in developing the present process were prepared by dissolving the metal as a soluble salt thereof and rendering the solution alkaline so as to precipitate a hydroxide of the metal. This precipitate was collected, washed and used.

In making the mixed oxide catalysts, different techniques were used depending upon whether a chromous or a chromic oxide was desired. When chromous oxide is used, the chromic oxide is dissolved as a soluble salt and reduced by any desired means, as by the use of $SO_2$ gas, before being precipitated. The second metal is also put into solution, and the two solutions mixed before either is precipitated. On the other hand, mixed chromic oxide catalysts are easily prepared by first making the oxide or hydroxide of the other metal, suspending it in water, adding the chromic oxide and either co-precipitating the two or evaporating the suspension to a thick paste which can be collected and dried.

The physical form in which the oxides are used as a catalyst may also be varied without departing from the scope of the present invention. Most of the dried oxide mass may be broken up into self-supporting granules which may be used directly. Preferably they should be screened to remove both the oversize and the fines, both of which interfere with the efficiency of the packing of the catalyst in the converter. Another good method of handling the material so as to obtain a uniform packing is to powder the material and form it into pellets. Most of the materials are readily pelleted without the use of any binder. However, for ease in handling, a few percent of a combustible waxy binder such as stearic acid may be used if so desired. It has the added advantage of making the pellets easy to discharge from the pelleting machine. After being packed in the converter, the binder may be readily and easily burned out with air.

A considerable variation in the nature and properties of the oxide which goes to make up the catalyst may also be made without departing from the scope of the present invention. The chromium oxide which is used alone or in combination with other oxides may be in either the three or six valent form. When used alone the trivalent form appears to give the better results. In admixture, the three or the six valent form may give the better results depending principally on the makeup of the other oxides present and the operating conditions. In many cases the presence of chromium, as an oxide, in both forms is helpful. In general the chromium oxide should be present in from about 1–3 mol parts for from 1–3 mol parts of the other oxide or oxides.

The other oxides present may also be varied to a considerable extent in composition as well as in amount. In developing the process of the present invention it was found that with the optimum conditions of feed rate and temperature, best results were obtained using from 1–3 mol parts of the oxides of copper, tin and zinc per part of chromium oxide. The invention however is not necessarily so limited. Useful results can be obtained using oxides of manganese, nickel, cobalt and iron if so desired. Replacing all or part of the metal oxide with an alkaline earth metal oxide such as barium or calcium usually has a slightly beneficial action on the production rate but decreases the yield of cymene by increasing the cracking rate. The presence of uncombined alkali metal oxides appears to be undesirable in that it prevents the proper "migration" of the hydrogen which must occur in cymene formation.

All of the catalysts of the present invention also have a marked advantage in that they may be used without the necessity for a diluent gas. Many dehydrogenation catalysts useful for other purposes such for example as metallic nickel are so active, at the temperatures at which the equilibrium is favorable to cymene production, that the time of contact must be controlled by means of a diluent. This is highly undesirable since it complicates both the process and apparatus and adds to the cost of operation. In most cases the catalysts of the present invention give better results in the absence of a diluent than they do when such a gas is used.

The invention will be more fully explained in connection with the following examples which are meant to be illustrative only and not by way of limitation.

EXAMPLE 1

A $Cr(OH)_3$ filter cake was prepared by dissolving $CrO_3$ in a sulfuric acid solution and adding ammonium hydroxide to the resultant solution, collecting the precipitate and washing it free from $SO_4^{--}$ ions. The cake was dried for 6 hours at 100–110° C. and finally for about 2 hours at 130° C. The dried cake was cut up and the 6 to 12 mesh fraction, of which 1 cc. weighed 0.416 gm., was used as the catalyst. 120 cc. of the catalyst was packed in a vertical column and a number of runs were made by passing vaporized dipentene therethrough, condensing the vapors and collecting the condensate.

The condensate was analyzed to find the degree of conversion by passing dry HCl gas through 25 cc. samples of the condensate in an ice bath at the rate of about 2 bubbles per second for 1½ hours. The ice bath was then removed and the gas bubbled through at the same rate for 1 hour at room temperature. Free HCl was removed by evacuating at 10 mm. of mercury for ½ hour at room temperature. Approximately 2 gms. of the sample was then treated with 50 cc. of neutral methanol after which 50 cc. of standardized alcoholic KOH was added and the mixture refluxed for 2 hours. Since the terpenes form stable hydrochlorides whereas the desirable products do not, titration of the excess KOH after saponification gives a measure of the terpenes found in the condensate. This method of analysis was also used in each of the following examples. Typical results are shown in Table I.

Table I

| Temp., ° C. (av.) | Feed, cc./hr. | Av. conv., per cent | Index |
|---|---|---|---|
| 452 | 10 | 73.7 | 40 |
| 460 | 10 | 64.5 | 45 |
| 471 | 10 | 57.1 | 41 |
| 470 | 20 | 51.1 | 40 |

It will be noted that at the lower temperature the reaction rate was unfavorable so that the index was low although the degree of conversion was high. By raising the temperature and the feed rate, better production was obtained but the conversion fell off in approximately the same proportion so that the index remained approximately constant. As will be shown in the following examples, by the use of an appropriate additional oxide, both the production and conversion rates were increased.

EXAMPLE 2

60 gms. of $CrO_3$ was dissolved in 500 cc. of distilled water to which 25 cc. of concentrated sulfuric acid was added and the $CrO_3$ reduced to $Cr_2(SO_4)_3$ with dry $SO_2$ gas. Then 250 gms. of $SnCl_2 \cdot 2H_2O$ was dissolved in 500 cc. of distilled water and this solution was added to the $Cr_2(SO_4)_3$ solution. The combined solution was poured slowly into hot aqueous ammonia (80–85° C.). The resultant precipitate was collected and washed free of $SO_4^{--}$ and $Cl^-$ ions on a suction filter. The filter cake was thoroughly dried, broken up and the 6 to 12 mesh portion, of which 1 cc. weighed 0.176 gm., used as a catalyst. Again, a number of runs were made by passing vaporized dipentene thereover at different temperatures and loadings, condensing the reacted vapors and analyzing the collected condensate. Illustrative examples are shown in Table II.

*Table II*

| Temp., ° C. (av.) | Feed, cc./hr. | Av. conv., per cent | Index |
|---|---|---|---|
| 385 | 10 | 43.3 | 40 |
| 410 | 10 | 38.7 | 37 |
| 445 | 10 | 45.3 | 44 |
| 455 | 25 | 70.0 | 63 |

EXAMPLE 3

180 gms. of $CrO_3$ was dissolved in 1 liter of distilled water to which 25 cc. of concentrated sulfuric acid had been added and the resultant solution reduced with $SO_2$. 248 gms. of $SnCl_2 \cdot 2H_2O$ was dissolved in 500 cc. of distilled water and added to the $Cr_2(SO_4)_3$ solution. A mixed hydroxide was precipitated by dissolving 325 gms. of NaOH in 3 liters of water, cooling the solution and adding it slowly with stirring to the Cr,Sn solution. After collecting the precipitated hydroxide and washing it free from $SO_4^{--}$ and $Cl^-$ ions on a vacuum filter, it was dried thoroughly, broken up and screened. The 6 to 12 mesh portion, of which 305 cc. weighed 263.5 gms., was used as a catalyst. 100. cc of catalyst was packed in a vertical column and vaporized dipentene passed therethrough at different temperatures and feed rates. Illustrative results are shown in Table III.

*Table III*

| Temp., ° C. (av.) | Feed, cc./hr. | Av. conv., per cent | Index |
|---|---|---|---|
| 375 | 20 | 60 | 46 |
| 427 | 20 | 71 | 56 |
| 432 | 20 | 57 | 45 |
| 419 | 20 | 72 | 56 |
| 419 | 10 | 74 | 50 |
| 407 | 20 | 70 | 59 |

EXAMPLE 4

330.6 gms. of ZnO was dissolved in 50% nitric acid. Sufficient aqueous ammonia to render the solution basic was stirred in slowly while keeping the temperature below about 18° C. The resultant precipitate was collected, washed free of nitric acid and suspended in 500 cc. of water to which 191 gms. of $CrO_3$ in 500 cc. of water was added. The mixture was agitated at 40–50° C. for about 2½ hours and then at 80–90° C. for 8 more hours during which time considerable evaporation occurred. The mass was transferred to an evaporating dish and heated over a steam bath, drying being finished at 130° C. in an electric furnace. The mass was broken up, screened and the 6 to 12 mesh portion, of which 1 cc. weighed 0.656 gm. was used as a catalyst. Using 110 cc. of catalyst the procedures of Examples 1 and 2 were repeated. Typical results are shown in Table IV.

*Table IV*

| Temp., ° C. (av.) | Feed, cc./hr. | Av. conv., per cent | Index |
|---|---|---|---|
| 350 | 10 | 16 | 12 |
| 502 | 15 | 51 | 33 |
| 527 | 15 | 67 | 41 |
| 535 | 25 | 73 | 51 |

EXAMPLE 5

147.1 gms. of $K_2Cr_2O_7$ was dissolved in 49 gms. of concentrated sulfuric acid in 110 cc. of water and the chromium reduced with $SO_2$ to produce a solution of $K_2SO_4 \cdot Cr_2(SO_4)_3$. Simultaneously 2 gm. mols ZnO were dissolved in 800 cc. of water containing 2 gm. mols of sulfuric acid. The two solutions were mixed and the hydroxides coprecipitated by the dropwise addition of 465 cc. of concentrated aqueous ammonia. Additional aqueous ammonia was added until the solution was basic, the whole being thoroughly agitated throughout the reaction. The resultant solution was heated to drive off excess ammonia and the precipitate collected and washed free from $SO_4^{--}$ ions on a suction filter. The filter cake was suspended in water and 196 gms. of $CrO_3$ in 250 cc. of water added thereto. The mixture was heated with agitation until a thick paste was obtained which was then transferred to an evaporator and thoroughly dried. The dried material was broken up and screened through a 20 mesh sieve. The powder was mixed with 2% stearic acid and made into 9/16 inch pellets on a Stokes pelleting machine. These pellets were then heated slowly to about 225° C. over a period of about 5 hours after which the stearic acid was completely burned out by heating in the presence of air. Using 110 cc. of these pellets as t e catalyst, the procedures of Examples 1 and 2 were repeated. Typical results are shown in Table V.

*Table V*

| Temp., ° C. (av.) | Feed, cc./hr. | Av. conv., per cent | Index |
|---|---|---|---|
| 372 | 15 | 62 | 58 |
| 372 | 25 | 72 | 65 |
| 402 | 20 | 84 | 72 |
| 402 | 30 | 72 | 70 |
| 427 | 40 | 91 | 70 |
| 452 | 40 | 78 | 70 |

EXAMPLE 6

687 gms. of $CuSO_4 \cdot 5H_2O$ was dissolved in 500 cc. of water and 220 gms. of NaOH in 1000 cc. of water added slowly thereto. The precipitate was collected on a suction filter and washed free from $SO_4^{--}$ ions. The filter cake was broken up and suspended in water with agitation and heated. While hot, 225 gms. of $CrO_3$ in 500 cc. of water was added and the heating and stirring was continued until a thick paste formed. This paste was transferred to an evaporator and dried thoroughly at 110–120° C. The dried mass was screened and 120 cc. of the 6 to 12 mesh portion, of which 1 cc. weighed 1 gm., was used as a catalyst, repeating the procedures of Examples 1 and 2. Typical results are shown in Table VI.

Table VI

| Temp., °C. (av.) | Feed, cc./hr. | Av. conv., per cent | Index |
|---|---|---|---|
| 423 | 25 | 42 | 32 |
| 463 | 40 | 27 | 20 |
| 496 | 40 | 56 | 43 |
| 480 | 60 | 57 | 44 |
| 480 | 20 | 64 | 49 |
| 462 | 20 | 65 | 39 |
| 462 | 12 | 61 | 45 |

EXAMPLE 7

0.75 gm. mols of $(NH_4)_2Cr_2O_7$ was dissolved in 750 cc. of water to which sufficient aqueous ammonia was added to change the orange color of the solution to yellow. Simultaneously a solution of 1½ gm. mols of $Cu(NO_3)_2$ in 450 cc. of water was prepared. The two solutions were stirred together slowly and the resultant reddish brown precipitate was collected on a suction filter, washed with water and thoroughly dried. The dried mass was collected and heated slowly to decomposition point while stirring to prevent local overheating. When cool, the catalyst was suspended in 300 cc. of 10% acetic acid and stirred for ½ hour. The solution was filtered and the precipitate again washed with water, dried and powdered. The powder was made into $\frac{1}{8}$ inch pellets of which 168 cc. weighed 175.4 gms. 110 cc. of these pellets were used as the catalyst in repeating the procedures of Examples 1 and 2. Typical results are shown in Table VII.

Table VII

| Temp., °C. (av.) | Feed, cc./hr. | Av. conv., per cent | Index |
|---|---|---|---|
| 360 | 10 | 58.5 | 56 |
| 362 | 20 | 63.1 | 60 |
| 392 | 25 | 62.8 | 59 |
| 445 | 40 | 74.0 | 68 |
| 447 | 50 | 79.7 | 72 |

I claim:
1. A process of producing p-cymene which comprises passing vapors of a monocyclic terpene at dehydrogenation temperatures over a catalyst comprising an oxide of chromium selected from the group consisting of $Cr_2O_3$, $CrO_3$ and mixtures of the same and at least one oxide selected from the group consisting of the oxides of copper, tin and zinc.

2. A process of producing p-cymene which comprises passing vapors of a monocyclic terpene at dehydrogenation temperatures over a catalyst comprising an oxide of chromium selected from the group consisting of $Cr_2O_3$, $CrO_3$ and mixtures of the same and at least one oxide selected from the group consisting of the oxides of copper, tin and zinc in the ratio of 1 to 3 mol parts of chromium oxide and 1 to 3 mol parts of the other oxides.

3. A process of producing p-cymene which comprises passing vapors of a monocyclic terpene at dehydrogenation temperatures over a catalyst comprising 1 to 3 mols of a chromium oxide selected from the group consisting of $Cr_2O_3$, $CrO_3$ and mixtures of the same and 1 to 3 mols of SnO.

4. A process of producing p-cymene which comprises passing vapors of a monocyclic terpene at dehydrogenation temperatures over a catalyst comprising 1 to 3 mols of a chromium oxide selected from the group consisting of $Cr_2O_3$, $CrO_3$ and mixtures of the same and 1 to 3 mols of CuO.

5. A process of producing p-cymene which comprises passing vapors of a monocyclic terpene at dehydrogenation temperatures over a catalyst comprising 1 to 3 mols of a chromium oxide selected from the group consisting of $Cr_2O_3$, $CrO_3$ and mixtures of the same and 1 to 3 mols of ZnO.

6. A process of producing p-cymene which comprises passing vapors of a monocyclic terpene at temperatures of from 410–525° C. over a catalyst comprising 1 to 3 mols of a chromium oxide selected from the group consisting of $Cr_2O_3$, $CrO_3$ and mixtures of the same and 1 to 3 mols of at least one oxide selected from the group consisting of the oxides of copper, tin and zinc.

WASHINGTON HULL.